(12) United States Patent
Biswas (10) Patent No.: US 12,392,272 B1
(45) Date of Patent: Aug. 19, 2025

(54) DUCT FOR AFTERTREATMENT SYSTEM

(71) Applicant: Caterpillar Inc., Peoria, IL (US)

(72) Inventor: Shib Shankar Biswas, Chennai (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/636,439

(22) Filed: Apr. 16, 2024

(51) Int. Cl.
*F01N 13/18* (2010.01)
*F01N 3/10* (2006.01)
*F01N 3/20* (2006.01)
*F01N 13/00* (2010.01)

(52) U.S. Cl.
CPC ......... *F01N 13/1805* (2013.01); *F01N 3/106* (2013.01); *F01N 3/2066* (2013.01); *F01N 13/009* (2014.06)

(58) Field of Classification Search
CPC .... F01N 13/1805; F01N 13/009; F01N 3/106; F01N 3/2066; F16L 17/00; F16L 23/024; F16L 23/032; F16L 13/04; F16L 41/021; F16L 41/08; F16L 41/02; F16L 41/082; B01F 2005/0638; B01F 2005/0639; B01F 5/0619; B01F 5/0618
USPC .......... 60/299, 324; 285/368, 405, 416, 422, 285/141.1, 197, 288, 288.5
See application file for complete search history.

(56) References Cited

U.S. PATENT DOCUMENTS

| | | | |
|---|---|---|---|
| 5,524,906 A * | 6/1996 | Rackov | F16J 15/0818 277/609 |
| 5,718,461 A | 2/1998 | Esser | |
| 10,577,996 B2 | 3/2020 | Alcenius et al. | |
| 11,549,629 B2 | 1/2023 | Eckols et al. | |
| 2004/0046391 A1* | 3/2004 | Vasudeva | F01N 13/1855 285/422 |
| 2016/0115847 A1* | 4/2016 | Chapman | F01N 3/2892 60/324 |
| 2017/0234188 A1* | 8/2017 | Singh | F01N 3/208 60/286 |

FOREIGN PATENT DOCUMENTS

JP 3238850 8/2022

* cited by examiner

*Primary Examiner* — Mark A Laurenzi
*Assistant Examiner* — Kelsey L Stanek (57) ABSTRACT

A duct for an aftertreatment system includes a body defining a first end and a second end and a flange coupled to the body at the first end of the body. The flange defines an outer edge. The duct includes a projection coupled to and extending from the flange along a first direction. The projection and the flange lie in a same plane. The projection defines a first side edge and a second side edge that is angularly spaced apart from the first side edge. The duct is adapted to be coupled with a component of the aftertreatment system via each of the outer edge of the flange, the first side edge of the projection, and the second side edge of the projection. The component includes at least one of a diesel oxidation catalyst of the aftertreatment system and a selective catalytic reduction module of the aftertreatment system.

20 Claims, 7 Drawing Sheets

DUCT FOR AFTERTREATMENT SYSTEM

TECHNICAL FIELD

The present disclosure relates to an engine system including an aftertreatment system, and more particularly, to a duct for the aftertreatment system and a method of assembling the aftertreatment system.

BACKGROUND

An engine system includes an engine, such as an internal combustion engine, to generate operating power. In order to comply with emission regulation standards, the engine system includes an aftertreatment system that is disposed downstream of the engine. The aftertreatment system may remove and/or control particulate matter that may be present in exhaust gases exiting the engine before the exhaust gases are let into atmosphere. The aftertreatment system typically includes a diesel oxidation catalyst (DOC), a selective catalytic reduction (SCR) module, and a mixing tube disposed between the DOC and the SCR module. Each of the DOC and the SCR module is housed in a canister. To fluidly couple the mixing tube with a corresponding canister of the DOC and the SCR module, the aftertreatment system further includes a pair of ducts. The duct may be coupled with a corresponding canister of the DOC or the SCR module via welding.

In order to weld the duct to the canister, some space/gap is desired between the duct and the canister. However, due to a design of conventional ducts and canisters, the space between the duct and the canister is minimal. Such a minimal space between the components renders a welding zone between the duct and the canister inaccessible to a weld torch, which may increase assembly efforts and assembly time required to assemble the aftertreatment system.

U.S. Pat. No. 10,577,996 describes an exhaust conduit having a wall with an inner surface that at least partially defines a flow channel, a first fin positioned within the flow channel and attached to the inner surface, a second fin positioned within the flow channel and attached to the inner surface such that the first fin is spaced apart from the second fin. A support strip is attached to the inner surface, attached to the first fin at a first location spaced apart from the inner surface, and attached to the second fin at a second location spaced apart from the inner surface.

SUMMARY OF THE DISCLOSURE

In one aspect of the present disclosure, a duct for an aftertreatment system is provided. The duct includes a body defining a first end and a second end. The duct also includes a flange coupled to the body at the first end of the body. The flange defines an outer edge. The duct further includes a projection coupled to and extending from the flange along a first direction. The projection and the flange lie in a same plane. The projection defines a first side edge and a second side edge that is angularly spaced apart from the first side edge. The duct is adapted to be coupled with a component of the aftertreatment system via each of the outer edge of the flange, the first side edge of the projection, and the second side edge of the projection. The component includes at least one of a diesel oxidation catalyst (DOC) of the aftertreatment system and a selective catalytic reduction (SCR) module of the aftertreatment system.

In one aspect of the present disclosure, an engine system is provided. The engine system includes an engine. The engine system also includes an aftertreatment system adapted to treat exhaust gases exiting the engine. The aftertreatment system includes a diesel oxidation catalyst (DOC) adapted to receive the exhaust gases from the engine. The aftertreatment system also includes a mixing tube in fluid communication with the DOC and adapted to receive the exhaust gases from the DOC. The aftertreatment system further includes a selective catalytic reduction (SCR) module in fluid communication with the mixing tube and adapted to receive the exhaust gases from the mixing tube. The aftertreatment system includes at least one duct. The at least one duct includes a body defining a first end and a second end. The at least one duct includes a flange coupled to the body at the first end of the body. The flange defines an outer edge. The duct further includes a projection coupled to and extending from the flange along a first direction. The projection and the flange lie in a same plane. The projection defines a first side edge and a second side edge that is angularly spaced apart from the first side edge. The duct is adapted to be coupled with a component of the aftertreatment system via each of the outer edge of the flange, the first side edge of the projection, and the second side edge of the projection. The component includes at least one of the DOC and the SCR module of the aftertreatment system.

In another aspect of the present disclosure, a method of assembling an aftertreatment system is provided. The method includes providing a duct of the aftertreatment system. The duct includes a body defining a first end and a second end. The duct also includes a flange coupled to the body at the first end of the body. The flange defines an outer edge. The duct further includes a projection coupled to and extending from the flange along a first direction. The projection and the flange lie in a same plane. The projection defines a first side edge and a second side edge that is angularly spaced apart from the first side edge. The method also includes coupling the duct with a component of the aftertreatment system via each of the outer edge of the flange, the first side edge of the projection, and the second side edge of the projection. The component includes at least one of a diesel oxidation catalyst (DOC) of the aftertreatment system and a selective catalytic reduction (SCR) module of the aftertreatment system.

DETAILED DESCRIPTION

Wherever possible, the same reference numbers will be used throughout the drawings to refer to same or like parts.

Figure 1:
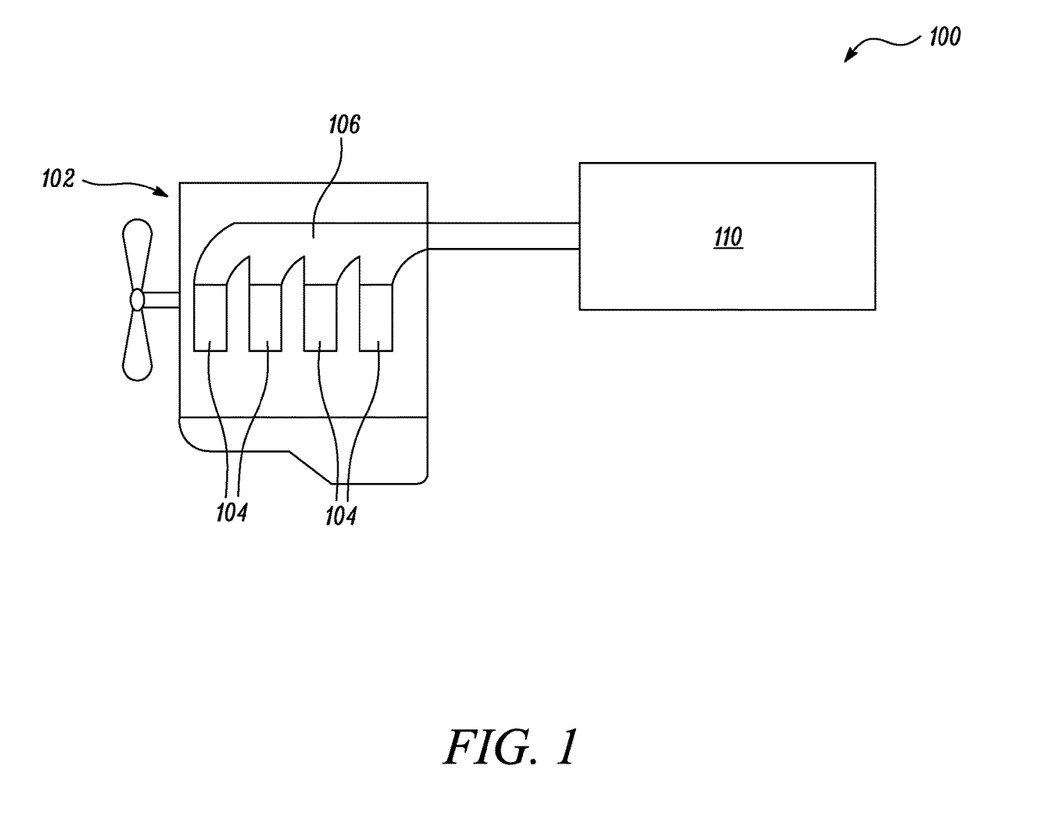
FIG. 1 illustrates a schematic view of an exemplary engine system.

FIG. 1 illustrates a schematic view of an exemplary engine system 100. The engine system 100 may be used in a variety of machines (not shown) including, but not limited to, mobile machines (such as, mining or construction machines), stationary machines, and like. The engine system 100 includes an engine 102. The engine 102 may be any type of engine, such as, an internal combustion engine, may be of any size, with any number of cylinders, any type of combustion chamber, such as, cylindrical, rotary spark ignition, compression ignition, 4-stroke and 2-stroke, etc., and in any configuration, such as, "V," in-line, radial, etc.

The engine 102 may include a number of components (not shown), such as, a crankshaft, a fuel system, an inlet manifold, an intake port, an exhaust port, and the like. Further, the engine 102 includes a number of cylinders 104 that define one or more combustion chambers (not shown). Moreover, exhaust gases generated based on combustion of fuels in the combustion chambers is directed towards an exhaust manifold 106 of the engine 102. The exhaust manifold 106 is in fluid communication with the cylinders 104. It should be noted that the exhaust gases exiting the engine 102 may include particulate matter, such as, carbon monoxide (CO), ammonia, and oxides of nitrogen (NOx), such as, nitric oxide (NO), nitrous oxide ($N_2O$), and nitrogen dioxide ($NO_2$).

The engine system 100 also includes an aftertreatment system 110 to treat the exhaust gases exiting the engine 102. Specifically, the aftertreatment system 110 may operate to reduce/eliminate a concentration of the particulate matter in the exhaust gases, before the exhaust gases are let into atmosphere. The aftertreatment system 110 is fluidly connected to the exhaust manifold 106 of the engine 102.

Figure 2:
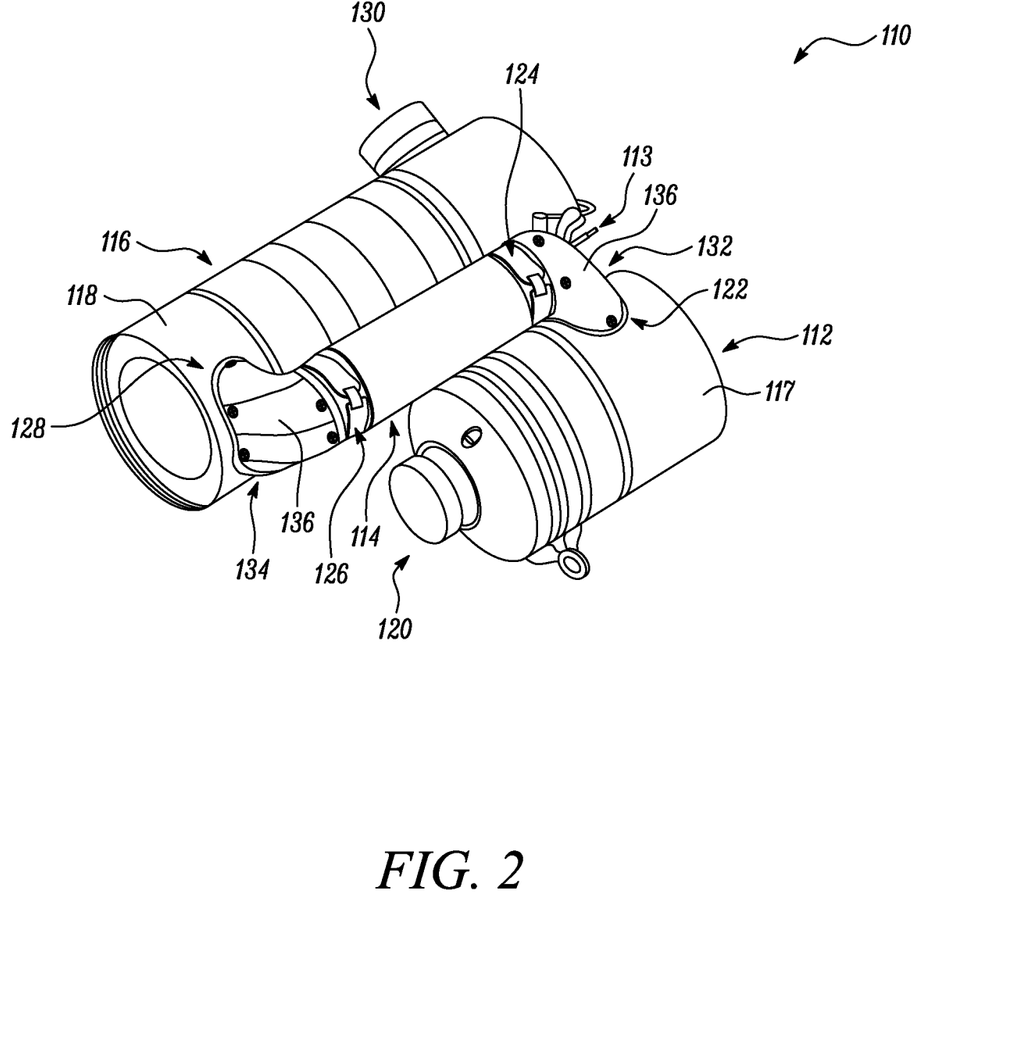
FIG. 2 illustrates a perspective view of an aftertreatment system associated with the engine system of FIG. 1, according to an embodiment of the present disclosure.

FIG. 2 illustrates a perspective view of the aftertreatment system 110, according to an embodiment of the present disclosure. In the illustrated embodiment of FIG. 2, the aftertreatment system 110 includes a diesel oxidation catalyst (DOC) 112. The aftertreatment system 110 also includes a mixing tube 114. The aftertreatment system 110 further includes a selective catalytic reduction (SCR) module 116. In some examples, the aftertreatment system 110 may further include a diesel particulate filter, an ammonia oxidation catalyst, and various temperature, pressure, and exhaust gas constituent sensors, based on application requirements.

The DOC 112 receives the exhaust gases from the engine 102. The DOC 112 defines an inlet side 120 that is coupled to the exhaust manifold 106 of the engine 102 and an outlet side 122 that is opposite to the inlet side 120. The exhaust gases coming from the engine 102 flow along the DOC 112 from the inlet side 120 to the outlet side 122 of the DOC 112. It should be noted that the DOC 112 includes various catalyst materials disposed within a first canister 117. The catalyst materials may collect, absorb, and/or convert CO and/or NOx present in the exhaust gases. Accordingly, CO and NOx present in the exhaust gases may get oxidized and may get converted into $CO_2$ and $NO_2$.

Further, the mixing tube 114 is in fluid communication with the DOC 112 and receives the exhaust gases from the DOC 112. The mixing tube 114 includes an inlet side 124 in fluid communication with the outlet side 122 of the DOC 112 to receive the exhaust gases from the DOC 112 and an outlet side 126 that is opposite to the inlet side 124 of the mixing tube 114. The mixing tube 114 promotes mixing of the exhaust gases with a reductant, for example, diesel exhaust fluid to improve a performance of the aftertreatment system 110. The aftertreatment system 110 also includes a reductant injector 113 that injects the reductant in the exhaust gases.

Moreover, the SCR module 116 is in fluid communication with the mixing tube 114 and receives the exhaust gases from the mixing tube 114. Accordingly, the mixing tube 114 is arranged between the DOC 112 and the SCR module 116. The SCR module 116 includes an inlet side 128 that is in fluid communication with the outlet side 126 of the mixing tube 114 and an outlet side 130 that may be exposed to atmosphere. The SCR module 116 includes one or more catalyst materials disposed within a second canister 118. The catalyst materials may reduce NOx present in the exhaust gases by converting NOx into nitrogen ($N_2$) and water ($H_2O$).

Further, the aftertreatment system 110 includes one or more ducts 132, 134. The present disclosure is related to the duct 132, 134 for the aftertreatment system 110. The one or more ducts 132 is a first duct 132 that provides fluid communication between the DOC 112 and the mixing tube 114. The duct 132 will be hereinafter interchangeably referred to as "the first duct 132". The one or more ducts 134 is a second duct 134 that provides fluid communication between the mixing tube 114 and the SCR module 116. The duct 134 will be hereinafter interchangeably referred to as "the second duct 134". As shown in FIG. 2, the first duct 132 fluidly couples the DOC 112 and the mixing tube 114, while the second duct 134 fluidly couples the SCR module 116 and the mixing tube 114. It should be noted that the first duct 132 is similar to the second duct 134 in terms of design and dimensions.

Figure 3:
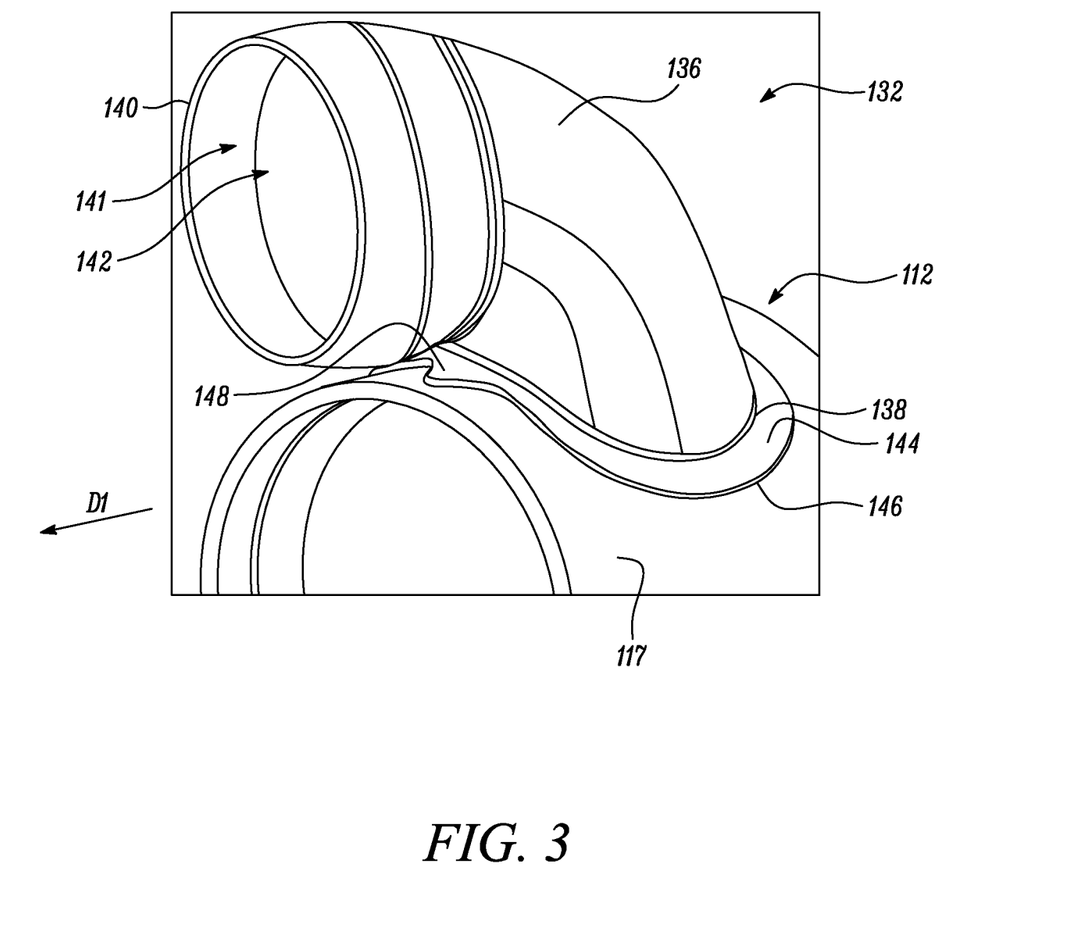
FIG. 3 illustrates a perspective view of a first duct of the aftertreatment system of FIG. 2, according to an embodiment of the present disclosure.

Referring to FIG. 3, a perspective view of the first duct 132 is illustrated. The first duct 132 will now be explained in detail with reference to FIG. 3. The first duct 132 includes a body 136 defining a first end 138 and a second end 140. The second end 140 is disposed opposite to the first end 138. The first duct 132 is coupled to the DOC 112 proximal to the first end 138 of the body 136. Further, the first duct 132 is coupled to the mixing tube 114 proximal to the second end 140 of the body 136. Thus, the first end 138 of the body 136 is in fluid communication with the outlet side 122 of the DOC 112 and the second end 140 of the body 136 is in fluid communication with the inlet side 124 of the mixing tube 114. Further, the first duct 132 is coupled to the mixing tube 114 proximal to the second end 140 of the body 136, to facilitate flow of the exhaust gases from the DOC 112 towards the mixing tube 114. In an example, the first duct 132 may be coupled with the mixing tube 114 using coupling elements, such as, mechanical fasteners, mounting brackets, and the like. Moreover, the reductant injector 113 (see FIG. 2) may be coupled to the body 136, such that the reductant injector 113 injects the reductant in the exhaust gases while the exhaust gases flow through the first duct 132.

The body 136 of the first duct 132 has an elbow shape. Further, the body 136 defines a flow passage 142 extending from the first end 138 to the second end 140 to facilitate flow of the exhaust gases through the body 136. An inlet opening (not shown) is defined at the first end 138 and an outlet opening 141 is defined at the second end 140. The outlet opening 141 facilitates an exit of the exhaust gases from the first duct 132.

The first duct 132 is coupled with a component 112 via a welded joint. The component 112 includes the DOC 112 herein. The DOC 112 may be hereinafter interchangeably referred to as "the component 112". Specifically, the first end 138 of the first duct 132 is coupled to the first canister 117 of the DOC 112 via the welded joint.

The first duct 132 also includes a flange 144 coupled to the body 136 at the first end 138 of the body 136. The flange 144 defines an outer edge 146. As such, the flange 144 and the outer edge 146 extend along a circumference of the body 136 at the first end 138. The first duct 132 further includes a projection 148 coupled to and extending from the flange 144 along the first direction D1. The flange 144 and the projection 148 lie in a same plane.

Figure 4:
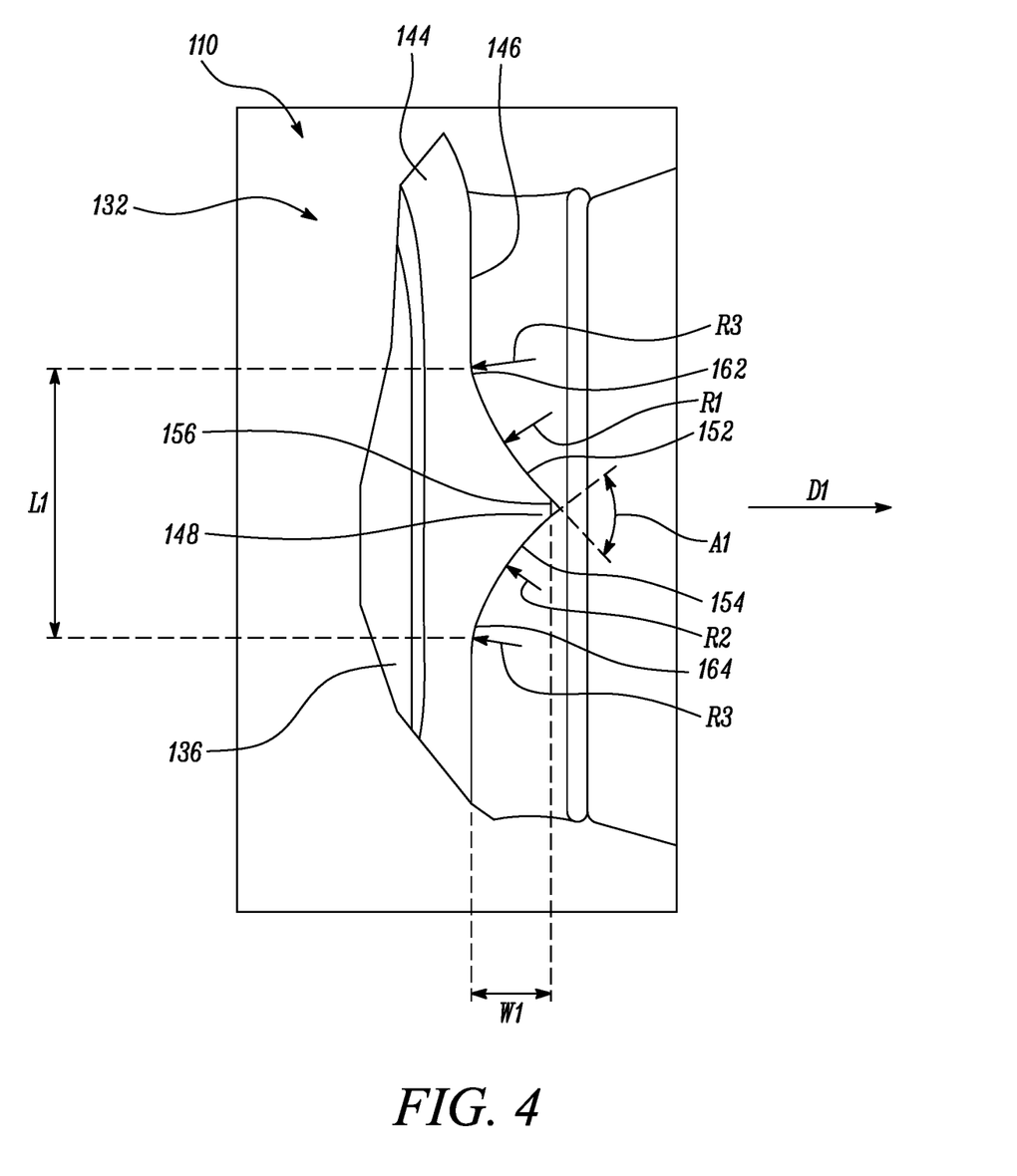
FIG. 4 illustrates a top view of a portion of the first duct of FIG. 3.
Figure 5:
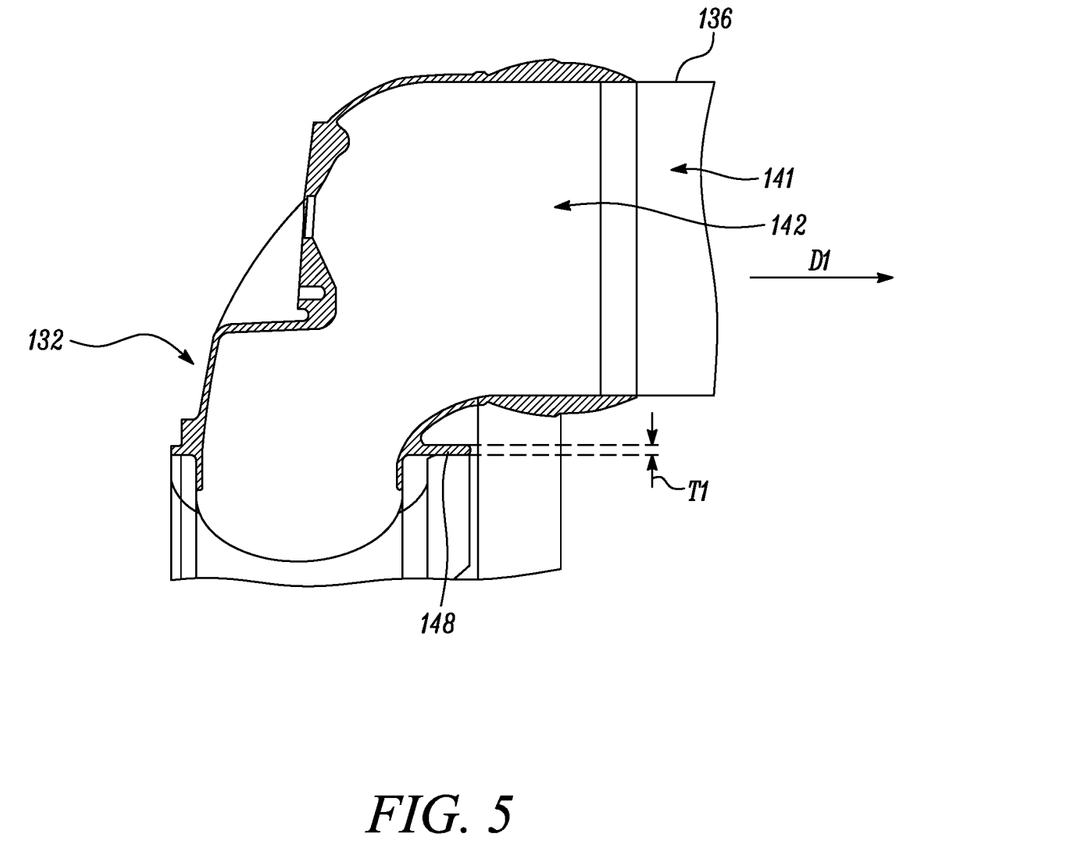
FIG. 5 illustrates a cross-sectional view of the first duct of FIG. 3.

As shown in FIG. 4, the projection 148 defines a length L1 orthogonal to the first direction D1 and a width W1 along the first direction D1. In some examples, the length L1 lies in a range of 40 millimeters (mm) to 100 mm and the width W1 lies in a range of 20 mm to 60 mm. Referring now to FIG. 5, the projection 148 also defines a thickness T1 orthogonal to the first direction D1. In some examples, the thickness T1 lies in a range of 3 mm and 6 mm.

Referring again to FIG. 4, the projection 148 defines a first side edge 152 and a second side edge 154 that is angularly spaced apart from the first side edge 152. The first duct 132 is coupled to the component 112 of the aftertreatment system 110 via each of the outer edge 146 of the flange 144, the first side edge 152 of the projection 148, and the second side edge 154 of the projection 148. Further, each of the first side edge 152 and the second side edge 154 has a curved shape. As apparent from FIG. 4, the projection 148 is shaped like a beak. In some examples, the first side edge 152 and the second side edge 154 may be spaced apart from each other by an angle A1 that lies in a range of 60 degrees to 120 degrees.

The first side edge 152 defines a first radius of curvature R1. Further, the second side edge 154 defines a second radius of curvature R2. In the illustrated embodiment of FIG. 4, the first radius of curvature R1 is same as the second radius of curvature R2. In some examples, the first radius of curvature R1 and the second radius of curvature R2 lie in a range of 50 mm to 150 mm. It should be noted that the ranges for the length L1, the width W1, the thickness T1 (see FIG. 5), the first radius of curvature R1, and the second radius of curvature R2 provided herein are exemplary in nature, and the values of the length L1, the width W1, the thickness T1, the first radius of curvature R1, and the second radius of curvature R2 may vary based on a size of the first duct 132.

As shown in FIG. 4, the projection 148 further includes a third side edge 156 extending between the first side edge 152 and the second side edge 154. The third side edge 156 has a linear profile. The first duct 132 is further coupled with the component 112 via the third side edge 156 of the projection 148.

The projection 148 further includes a first arcuate portion 162 extending between the first side edge 152 and the outer edge 146 of the flange 144. The first duct 132 is further coupled with the component 112 via the first arcuate portion 162. Further, the projection 148 includes a second arcuate portion 164 extending between the second side edge 154 and the outer edge 146 of the flange 144. The first duct 132 is further coupled with the component 112 via the second arcuate portion 164. Each of the first arcuate portion 162 and the second arcuate portion 164 defines a third radius of curvature R3. In some examples, the third radius of curvature R3 lies in a range of 10 mm to 30 mm, without any limitations. The body 136, the flange 144, and the projection 148 of the first duct 132 are integral with each other. Further, the first duct 132 may be made of a metal or an alloy. In an example, the first duct 132 may be manufactured by a casting process.

Figure 6:
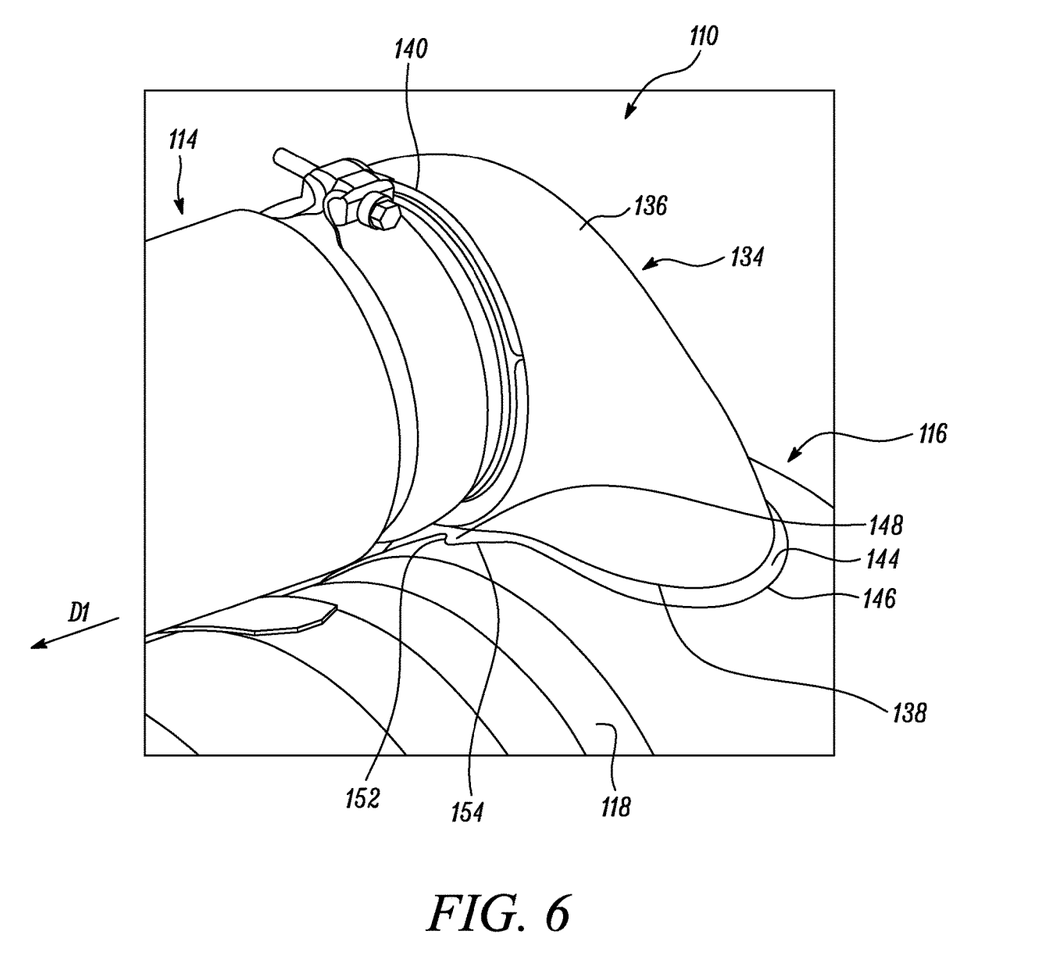
FIG. 6 illustrates a perspective view of a second duct of the aftertreatment system of FIG. 2, according to an embodiment of the present disclosure.

Referring now to FIG. 6, a perspective view of the second duct 134 is illustrated. The second duct 134 will now be explained with reference to FIG. 6. The second duct 134 is substantially similar to the first duct 132 in terms of design and dimensions, with common components being referred to by the same numerals. The second duct 134 includes the body 136 defining the first end 138 and the second end 140. The second duct 134 is coupled to the SCR module 116 proximal to the first end 138 of the body 136. Further, the second duct 134 is coupled to the mixing tube 114 proximal to the second end 140 of the body 136. The duct 132 is coupled to the mixing tube 114 proximal to the second end 140 of the body 136, to facilitate flow of the exhaust gases from the mixing tube 114 towards the SCR module 116. In an example, the second duct 134 may be coupled with the mixing tube 114 using coupling elements, such as, mechanical fasteners, mounting brackets, and the like.

The second duct 134 is coupled with a component 116 via a welded joint. The component 116 includes the SCR module 116 herein. The SCR module 116 may be hereinafter interchangeably referred to as "the component 116". Specifically, the first end 138 of the second duct 134 is coupled to the second canister 118 of the SCR module 116 via the welded joint.

The second duct 134 also includes the flange 144 coupled to the body 136 at the first end 138 of the body 136. The flange 144 defines the outer edge 146. The second duct 134 further includes the projection 148 coupled to and extending from the flange 144 along the first direction D1. The flange 144 and the projection 148 lie in the same plane. The projection 148 defines the first side edge 152 and the second side edge 154 that is angularly spaced apart from the first side edge 152. The second duct 134 is coupled to the component 116 of the aftertreatment system 110 via each of the outer edge 146 of the flange 144, the first side edge 152 of the projection 148, and the second side edge 154 of the projection 148.

The projection 148 further includes the third side edge (not shown in FIG. 6) which is same as the third side edge 156 shown in FIG. 4. The projection 148 further includes a first arcuate portion (not shown in FIG. 6) which is same as the first arcuate portion 162 shown in FIG. 4. Further, the projection 148 includes a second arcuate portion (not shown in FIG. 6) which is same as the second arcuate portion 164 shown in FIG. 4. The body 136, the flange 144, and the projection 148 of the second duct 134 are integral with each other. Further, the second duct 134 may be made of a metal or an alloy. In an example, the second duct 134 may be manufactured by a casting process.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to the duct 132, 134 for the aftertreatment system 110 and a method 700 of assembling the aftertreatment system 110. The duct 132, 134 includes the projection 148. The projection 148 is shaped like a beak that improves weld torch accessibility in a welding zone between the duct 132, 134 and the first and second canister 117, 118, respectively, which may improve a welding process of the duct 132, 134 with the first and second canister 117, 118, respectively. Further, the first side edge 152, the second side edge 154, the first arcuate portion 162, and the second arcuate portion 164 are embodied as curved surfaces that may simplify welding of the duct 132, 134 with the first and second canister 117, 118, respectively.

The ducts 132, 134 described herein may reduce an assembly time of the aftertreatment system 110 and may improve assembly line productivity. Further, the ducts 132, 134 may also reduce assembly efforts, by simplifying an assembly process of the duct 132, 134 with the first and second canister 117, 118, respectively. Furthermore, the projection 148 provides a cost effective solution of improving weld torch accessibility without modifying a design of the body 136 of the ducts 132, 134.

Figure 7:
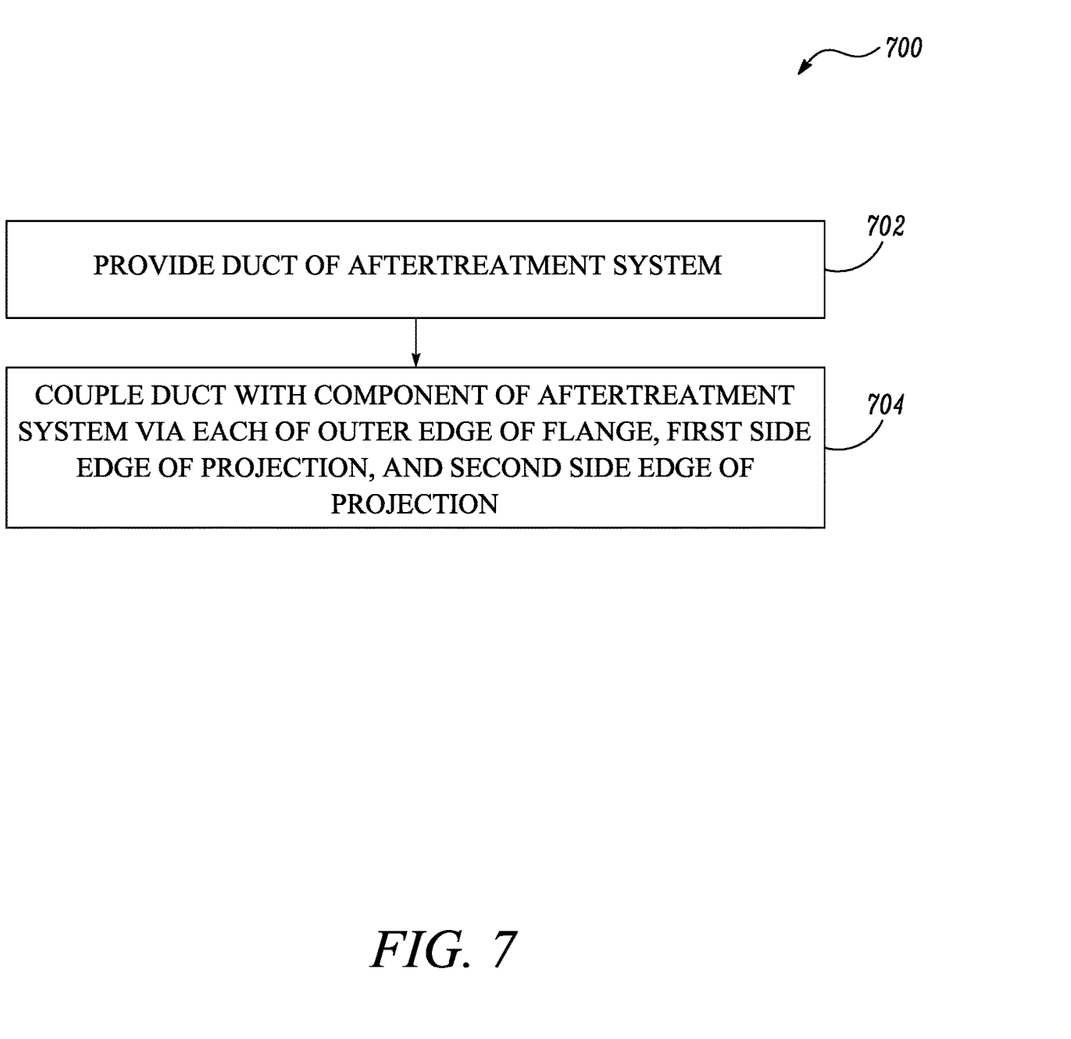
FIG. 7 illustrates a flowchart for a method of assembling the aftertreatment system, according to an embodiment of the present disclosure.

FIG. 7 illustrates a flowchart for the method 700 of assembling the aftertreatment system 110. At step 702, the duct 132, 134 of the aftertreatment system 110 is provided. The duct 132, 134 includes the body 136 defining the first end 138 and the second end 140. The duct 132, 134 also includes the flange 144 coupled to the body 136 at the first end 138 of the body 136. The flange 144 defines the outer edge 146. The duct 132, 134 further includes the projection 148 coupled to and extending from the flange 144 along the first direction D1. The projection 148 and the flange 144 lie in the same plane. The projection 148 defines the first side edge 152 and the second side edge 154 that is angularly spaced apart from the first side edge 152.

At step 704, the duct 132, 134 is coupled with the component 112, 116 of the aftertreatment system 110 via each of the outer edge 146 of the flange 144, the first side edge 152 of the projection 148, and the second side edge 154 of the projection 148. The component 112, 116 includes the DOC 112 of the aftertreatment system 110 or the SCR module 116 of the aftertreatment system 110. The step 704 further includes welding the duct 132, 134 with the component 112, 116.

The projection 148 further includes the third side edge 156 extending between the first side edge 152 and the second side edge 154. The third side edge 156 has the linear profile. The step 704 further includes coupling the duct 132, 134 with the component 112, 116 via the third side edge 156.

The projection 148 further includes the first arcuate portion 162 extending between the first side edge 152 and the outer edge 146 of the flange 144. The projection 148 further includes the second arcuate portion 164 extending between the second side edge 154 and the outer edge 146 of the flange 144. The step 704 further includes coupling the duct 132, 134 with the component 112, 116 via the first arcuate portion 162. The step 704 further includes coupling the duct 132, 134 with the component 112, 116 via the second arcuate portion 164.

The aftertreatment system 110 includes the mixing tube 114. The method 700 further includes a step at which the duct 132, 134 is coupled with the mixing tube 114 proximal to the second end 140 of the body 136.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A duct for an aftertreatment system, the duct comprising:
    a body defining a first end and a second end;
    a flange coupled to the body at the first end of the body, wherein the flange defines an outer edge; and
    a projection shaped like a beak, the projection coupled to and extending from the flange along a first direction in a welding zone, wherein the projection and the flange lie in a same plane, wherein the projection defines a first side edge and a second side edge that is angularly spaced apart from the first side edge, wherein the duct is adapted to be coupled with a component of the aftertreatment system via each of the outer edge of the flange, the first side edge of the projection, and the second side edge of the projection, and wherein the component includes at least one of a diesel oxidation catalyst (DOC) of the aftertreatment system and a selective catalytic reduction (SCR) module of the aftertreatment system.

2. The duct of claim 1, wherein the projection further includes a third side edge extending between the first side edge and the second side edge, wherein the third side edge has a linear profile, and wherein the duct is further coupled with the component via the third side edge.

3. The duct of claim 1, wherein the first side edge defines a first radius of curvature, wherein the second side edge defines a second radius of curvature, and wherein the first radius of curvature is same as the second radius of curvature.

4. The duct of claim 1, wherein the projection further includes:
    a first arcuate portion extending between the first side edge and the outer edge of the flange, wherein the duct is further coupled with the component via the first arcuate portion; and
    a second arcuate portion extending between the second side edge and the outer edge of the flange, wherein the duct is further coupled with the component via the second arcuate portion.

5. The duct of claim 1, wherein the body of the duct has an elbow shape.

6. The duct of claim 1, wherein the aftertreatment system includes a mixing tube, and wherein the duct is adapted to be coupled to the mixing tube proximal to the second end of the body.

7. The duct of claim 1, wherein the duct is coupled with the component via a welded joint.

8. An engine system comprising:
    an engine; and
    an aftertreatment system adapted to treat exhaust gases exiting the engine, the aftertreatment system including:
        a diesel oxidation catalyst (DOC) adapted to receive the exhaust gases from the engine;
        a mixing tube in fluid communication with the DOC and adapted to receive the exhaust gases from the DOC;
        a selective catalytic reduction (SCR) module in fluid communication with the mixing tube and adapted to receive the exhaust gases from the mixing tube; and
        at least one duct including:
            a body defining a first end and a second end;
            a flange coupled to the body at the first end of the body, wherein
            the flange defines an outer edge; and
            a projection shaped like a beak, the projection coupled to and extending from the flange along a first direction in a welding zone, wherein the projection and the flange lie in a same plane, wherein the projection defines a first side edge and a second side edge that is angularly spaced apart from the first side edge, wherein the at least one duct is coupled with a component of the aftertreatment system via each of the outer edge of the flange, the first side edge of the projection, and the second side edge of the projection, and wherein the component includes at least one of the DOC and the SCR module of the aftertreatment system.

9. The engine system of claim 8, wherein the projection further includes a third side edge extending between the first side edge and the second side edge, wherein the third side edge has a linear profile, and wherein the at least one duct is further coupled with the component via the third side edge.

10. The engine system of claim 8, wherein the first side edge defines a first radius of curvature, wherein the second side edge defines a second radius of curvature, and wherein the first radius of curvature is same as the second radius of curvature.

11. The engine system of claim 8, wherein the projection further includes:
a first arcuate portion extending between the first side edge and the outer edge of the flange, wherein the at least one duct is further coupled with the component via the first arcuate portion; and
a second arcuate portion extending between the second side edge and the outer edge of the flange, wherein the at least one duct is further coupled with the component via the second arcuate portion.

12. The engine system of claim 8, wherein the body of the at least one duct has an elbow shape.

13. The engine system of claim 8, wherein the at least one duct is coupled with the component via a welded joint.

14. The engine system of claim 8, wherein the at least one duct is a first duct that provides fluid communication between the DOC and the mixing tube, wherein the first duct is coupled to the DOC proximal to the first end of the body, and wherein the first duct is coupled to the mixing tube proximal to the second end of the body.

15. The engine system of claim 8, wherein the at least one duct is a second duct that provides fluid communication between the mixing tube and the SCR module, wherein the second duct is coupled to the SCR module proximal to the first end of the body, and wherein the second duct is coupled to the mixing tube proximal to the second end of the body.

16. A method of assembling an aftertreatment system, the method comprising:
providing a duct of the aftertreatment system, the duct including:
a body defining a first end and a second end;
a flange coupled to the body at the first end of the body, wherein the flange defines an outer edge; and
a projection shaped like a beak, the projection coupled to and extending from the flange along a first direction in a welding zone, wherein the projection and the flange lie in a same plane, and wherein the projection defines a first side edge and a second side edge that is angularly spaced apart from the first side edge; and
coupling the duct with a component of the aftertreatment system via each of the outer edge of the flange, the first side edge of the projection, and the second side edge of the projection, wherein the component includes at least one of a diesel oxidation catalyst (DOC) of the aftertreatment system and a selective catalytic reduction (SCR) module of the aftertreatment system.

17. The method of claim 16, wherein the projection further includes a third side edge extending between the first side edge and the second side edge, wherein the third side edge has a linear profile, and wherein the step of coupling the duct with the component further includes coupling the duct with the component via the third side edge.

18. The method of claim 16, wherein the projection further includes a first arcuate portion extending between the first side edge and the outer edge of the flange, wherein the projection further includes a second arcuate portion extending between the second side edge and the outer edge of the flange, and wherein the step of coupling the duct with the component further includes:
coupling the duct with the component via the first arcuate portion; and
coupling the duct with the component via the second arcuate portion.

19. The method of claim 16, wherein the aftertreatment system includes a mixing tube, the method further comprising coupling the duct with the mixing tube proximal to the second end of the body.

20. The method of claim 16, wherein the step of coupling the duct with the component further includes welding the duct with the component.

* * * * *